US010781080B2

(12) United States Patent
Dowy

(10) Patent No.: US 10,781,080 B2
(45) Date of Patent: Sep. 22, 2020

(54) OVERHEAD TRAVELLING CRANE

(71) Applicant: Konecranes Global Corporation, Hyvinkää (FI)

(72) Inventor: Lutz Dowy, Iserlohn (DE)

(73) Assignee: Konecranes Global Corporation, Hyvinkää (FI)

( * ) Notice: Subject to any disclaimer, the term of this patent is extended or adjusted under 35 U.S.C. 154(b) by 0 days.

(21) Appl. No.: 16/342,778

(22) PCT Filed: Oct. 18, 2017

(86) PCT No.: PCT/EP2017/076542
§ 371 (c)(1),
(2) Date: Apr. 17, 2019

(87) PCT Pub. No.: WO2018/073279
PCT Pub. Date: Apr. 26, 2018

(65) Prior Publication Data
US 2019/0256329 A1 Aug. 22, 2019

(30) Foreign Application Priority Data
Oct. 21, 2016 (DE) .................. 10 2016 120 115

(51) Int. Cl.
*B66C 17/00* (2006.01)
*H02J 7/00* (2006.01)
(Continued)

(52) U.S. Cl.
CPC ............... *B66C 17/00* (2013.01); *B66C 9/14* (2013.01); *B66C 13/12* (2013.01); *H02J 7/0013* (2013.01);
(Continued)

(58) Field of Classification Search
CPC ........... B66C 13/12; B66C 9/14; B66C 17/00; B66C 19/00; B66C 19/007; H02J 7/0013;
(Continued)

(56) References Cited

U.S. PATENT DOCUMENTS 4,243,147 A * 1/1981 Twitchell ............. A61G 7/1015
104/172.1
2004/0125618 A1 * 7/2004 De Rooij ................ H02J 1/102
363/17

(Continued)

FOREIGN PATENT DOCUMENTS

CN 205419564 U 8/2010
CN 102111018 A 6/2011
(Continued)

OTHER PUBLICATIONS

International Search Report of the International Searching Authority from corresponding Patent Cooperation Treaty (PCT) Application No. PCT/EP2017/076542, indicated completed on Feb. 8, 2018.
(Continued)

*Primary Examiner* — Michael R Mansen
*Assistant Examiner* — Juan J Campos, Jr.
(74) *Attorney, Agent, or Firm* — Gardner, Linn, Burkhart & Ondersma LLP

(57) ABSTRACT

An overhead travelling crane having a horizontally extending crane girder, which can be displaced in a railbound manner along a craneway, and having a crane trolley, which can be displaced along the crane girder and carries a lifting gear for raising and lowering a load. The lifting gear has a suspension structure formed as a cable or chain and the overhead travelling crane has electric drives for movements of the overhead travelling crane. The overhead travelling crane has an energy store connected to the drives to supply the drives with energy.

18 Claims, 2 Drawing Sheets

(51) Int. Cl.
*H02J 7/35* (2006.01)
*H02J 7/14* (2006.01)
*B66C 13/12* (2006.01)
*B66C 9/14* (2006.01)
*H02J 7/02* (2016.01)

(52) U.S. Cl.
CPC .............. *H02J 7/1446* (2013.01); *H02J 7/35* (2013.01); *H02J 7/025* (2013.01); *Y02P 90/50* (2015.11)

(58) Field of Classification Search
CPC . H02J 7/35; H02J 7/1446; H02J 7/025; Y02P 90/50
See application file for complete search history.

(56) References Cited

U.S. PATENT DOCUMENTS

| | | | | |
|---|---|---|---|---|
| 2005/0191528 A1* | 9/2005 | Cortes | ............... | H01M 10/4285 429/7 |
| 2011/0148360 A1* | 6/2011 | Lee | ............... | H02J 7/35 320/134 |
| 2011/0193518 A1* | 8/2011 | Wright | ............... | H01M 10/44 320/101 |
| 2012/0267957 A1* | 10/2012 | Czarnecki | ............... | H02J 3/02 307/64 |
| 2014/0291269 A1* | 10/2014 | Passmann | ............... | B66C 17/00 212/312 |
| 2015/0053636 A1* | 2/2015 | Pa Mann | ............... | B66C 19/00 212/71 |
| 2015/0259179 A1* | 9/2015 | Pa Mann | ............... | B66C 19/00 212/71 |
| 2015/0266703 A1* | 9/2015 | Pa Mann | ............... | B66C 19/00 212/71 |
| 2016/0322860 A1* | 11/2016 | Wu | ............... | H02J 9/06 |
| 2017/0144867 A1* | 5/2017 | Pa Mann | ............... | B66C 6/00 |
| 2018/0029848 A1* | 2/2018 | Passmann | ............... | B66C 7/00 |

FOREIGN PATENT DOCUMENTS

| | | |
|---|---|---|
| CN | 102126677 A | 7/2011 |
| CN | 203199888 U | 9/2013 |
| CN | 105692462 A | 6/2016 |
| DE | 8711705 U1 | 1/1988 |
| DE | 10323025 A1 | 10/2004 |
| EP | 2330069 A1 | 6/2011 |
| EP | 2345619 A1 | 7/2011 |
| EP | 2354075 A1 | 8/2011 |
| EP | 2838830 B1 | 12/2015 |
| GB | 2455499 A | 6/2009 |

OTHER PUBLICATIONS

Written Opinion of the International Searching Authority from corresponding Patent Cooperation Treaty (PCT) Application No. PCT/EP2017/076542, indicated completed on Feb. 8, 2018.
International Preliminary Examination Report from corresponding Patent Cooperation Treaty (PCT) Application No. PCT/EP2017/076542, dated Feb. 6, 2019.
Preliminary Report on Patentability of International Searching Authority in English from corresponding Patent Cooperation Treaty (PCT) Application No. PCT/EP2017/076542, completed Feb. 6, 2019.

* cited by examiner

OVERHEAD TRAVELLING CRANE

CROSS REFERENCE TO RELATED APPLICATION

The present invention claims the priority benefits of International Patent Application No. PCT/EP2017/076542, filed Oct. 18, 2017, and claims benefit of German patent application DE 10 2016 120 115.4, filed on Oct. 21, 2016.

BACKGROUND AND FIELD OF THE INVENTION

The invention relates to a travelling crane.

The craneway of such travelling cranes comprises at least two stationary profile girders used as a travel rail. The travel rails extend spaced apart from each other and in parallel with each other in the horizontal direction of travel of the travelling crane and are arranged high above the floor. Each profile girder hereby forms at least one running surface of the craneway, on which a corresponding travelling crane is guided via its running gear units and can thus travel lane-bound or rail-bound.

A distinction is made between numerous types of travelling crane. In the case of bridge cranes and suspension cranes, the running gear units are arranged in the region of the opposite ends of the crane girder extending horizontally and transversely to the direction of travel. The travel rails typically lie in a common horizontal plane. In the case of wall-mounted travelling cranes, the travel rails are arranged substantially vertically one above the other and are attached to a support structure which can be a component of a wall or can be free-standing. A bracket-like support body is arranged on the non-protruding end of the crane girder of wall-mounted travelling cranes. A plurality of running gear units are attached to the support body and are used to support the bracket crane, also referred to as wall-mounted travelling crane, on the upper and lower travel rails.

Rail-bound gantry cranes are also a type of travelling crane. However, in contrast to the above-mentioned travelling cranes in accordance with the invention, the travel rails of gantry cranes are typically arranged in the region of the floor, wherein the travel rails lie on the floor or may be partly embedded in the floor. The crane girder arranged high above the floor is elevated by gantry struts which are connected to the opposite ends of the crane girder. The running gear units are arranged on the ends of the gantry struts facing the respective travel rail.

Travelling cranes can be installed and used in the open air outside of a building or within a building such as e.g. a workshop. The term "indoor crane" is also typical in the latter case.

Corresponding travelling cranes which can travel lane-bound or rail-bound along a stationary craneway, or the drives of such cranes, are typically permanently connected during operation to an external energy source, e.g. the local public power supply network, in order to be supplied with the required electrical energy thereby. The electrical connection required for this can be established via a stationary contact line and current collectors arranged on the travelling crane which move with the crane as the crane travels and are always in conducting contact with the contact line. Alternatively, the electrical connection can also be established via cables by means of an energy chain. The contact line or energy chain generally extends along the craneway or travel rails in order to ensure a permanent electrical connection between the drives and the external electrical energy source during operation of the travelling crane even during travel along the craneway. This requires a correspondingly high level of structural complexity to establish the permanent electrical connection.

A gantry crane is known from the French company COMEGE SAS (retrievable from http://www.comege.fr/en/products/gantry-cranes/PORTMOT-en) which, via its electrical travel drive, can travel in a non-rail-bound—and therefore free—manner on a floor. A crane trolley which carries a chain pull can travel along a horizontally extending crane girder of the gantry crane. The gantry crane can be fitted with batteries via which the travel drive, the trolley drive and the lifting drive of the chain pull can be supplied with power.

Gantry cranes which can freely travel on a floor and have a battery-operated drive are also known from EP 2 354 075 A1 and EP 2 345 619 A1.

A tower crane is known from GB 2 455 499 A and includes a hybrid drive with an internal combustion engine/generator unit and a battery. The battery can be charged by means of the internal combustion engine/generator unit or by means of solar cells arranged on the crane jib.

Fitting a tower crane with a battery is also known from EP 2 330 069 A1.

DE 87 11 705 U1 discloses a battery-driven transfer and locomotion auxiliary device for people.

SUMMARY OF THE INVENTION

The present invention provides an improved travelling crane in which a contact line or energy chain does not have to be provided for supplying energy to the travelling crane along the craneway.

A travelling crane having a horizontally extending crane girder which can travel rail-bound along a craneway, wherein the craneway includes stationary profile girders serving as travel rails, the travel rails extend spaced apart from each other and in parallel with each other in the horizontal direction of travel of the travelling crane and are arranged high above a floor, and having a crane trolley which can travel along the crane girder and carries a lifting device for raising and lowering a load, wherein the lifting device comprises a carrying means formed as a cable or chain and the travelling crane comprises electrical drives for movements of the travelling crane is improved by virtue of the fact that the travelling crane comprises an energy storage device which is connected to the drives in order to supply the drives with energy. This avoids having to install contact lines, cable connections or energy chains which previously had to be guided along the craneway in order to maintain, during on-going operation, a permanent connection between the internal energy supply network of the travelling crane and an external stationary energy source. The energy storage device preferably includes one or more rechargeable batteries, e.g. so-called gel batteries or lithium ion batteries.

In an advantageous manner, provision is hereby made that the travelling crane comprises a crane drive for moving the crane girder and, for the lifting device, a lifting drive for raising and lowering a load, and in particular a trolley drive for moving the crane trolley, and the energy storage device is connected to these drives in order to supply the respective drive with energy. The energy storage device is preferably connected, in addition to all the provided drives of the travelling crane, also to all the other electrical consumers of the travelling crane, e.g. lights, crane control devices or safety control devices, in order to supply these consumers with energy. This can be effected e.g. as described below via the common internal energy supply network of the travelling crane.

In an advantageous manner, provision is made that the energy storage device is arranged on the crane girder. The energy storage device is thus carried by the crane girder and moves with it as the crane girder is moved.

In an advantageous manner, a charging station is also provided which can be approached by the travelling crane in such a manner that the energy storage device can draw energy from the charging station as required when the travelling crane is in the charging station.

In an advantageous manner, energy transfer means are provided for this purpose in order to transfer energy from the charging station to the energy storage device in a contacted and/or contact-less manner. For contacted energy transfer, corresponding charging contacts are provided on the charging station and on the travelling crane. For contact-less energy transfer, e.g. by electromagnetic induction, corresponding coils and electrical conductors are to be provided on the travelling crane and the charging station. Preferably, the respective energy transfer means are arranged in the region of the craneway or the running gear units of the travelling crane such that the charging station forms a type of docking station for the travelling crane.

In an advantageous manner, provision is additionally made that the charging station draws energy from an external energy source which includes a solar module and/or a public power supply network. The solar module is independent of the public power supply network.

In an advantageous manner, a second energy storage device is provided which is connected to the charging station and the external energy source in order to draw energy from the external energy source, to store said energy and to output said energy to the energy storage device of the travelling crane via the charging station. The second energy storage device is thus used as a stationary electrical intermediate storage device which is not moved with the travelling crane. The second energy storage device, in a similar manner to the energy storage device of the travelling crane, can include one or more rechargeable batteries, e.g. so-called gel batteries or lithium ion batteries. The second energy storage device is particularly advantageous if the external energy source includes a solar module, the fluctuating generation of energy of which can be compensated for by means of the second energy storage device. As a result, in terms of the charging capacity of the second energy storage device, it becomes possible to decouple from the energy generation by the solar module. By additionally integrating the public power supply network for supplying power to the charging station or to the second energy storage device, it is also possible to compensate for a relatively long phase of insufficient energy generation by the solar module. In an advantageous manner, renewable energy in the form of solar energy can thus be used. This is suitable in particular for indoor cranes with a solar module arranged outside of the workspace, e.g. on the roof of the workspace.

In an advantageous manner, provision can also be made that the energy storage device of the travelling crane is connected to a solar module in order to be charged thereby and the solar module is preferably arranged on the travelling crane, in particular on the crane girder. This is suitable in particular for travelling cranes set up in the open air. If sufficient energy generation by the solar module is possible within a building, the travelling crane can also be installed within a building.

In a structurally simple manner, provision can be made that the travelling crane comprises a second crane girder which extends in parallel with and spaced apart from the first crane girder so that the crane trolley can travel along the two crane girders. The travelling crane is then formed as a dual girder travelling crane.

According to an advantageous method for charging the energy storage device of a corresponding travelling crane, provision is made that during an interruption in operation of the travelling crane, the travelling crane is automatically moved to the charging station for charging of the energy storage device, preferably after a load picking-up means of the travelling crane has been raised, in particular to the highest lifting position below the crane trolley.

An exemplified embodiment of the invention is explained in greater detail with reference to the following description.

DESCRIPTION OF THE PREFERRED EMBODIMENTS

The explanations given hereinafter by way of example using a single-girder bridge crane also apply correspondingly to other travelling cranes as defined in the introductory part, in particular also for suspension cranes and wall-mounted travelling cranes which, like a bridge crane, can also each be formed as a dual-girder travelling crane having two parallel and mutually spaced apart crane girders.

Figure 1:
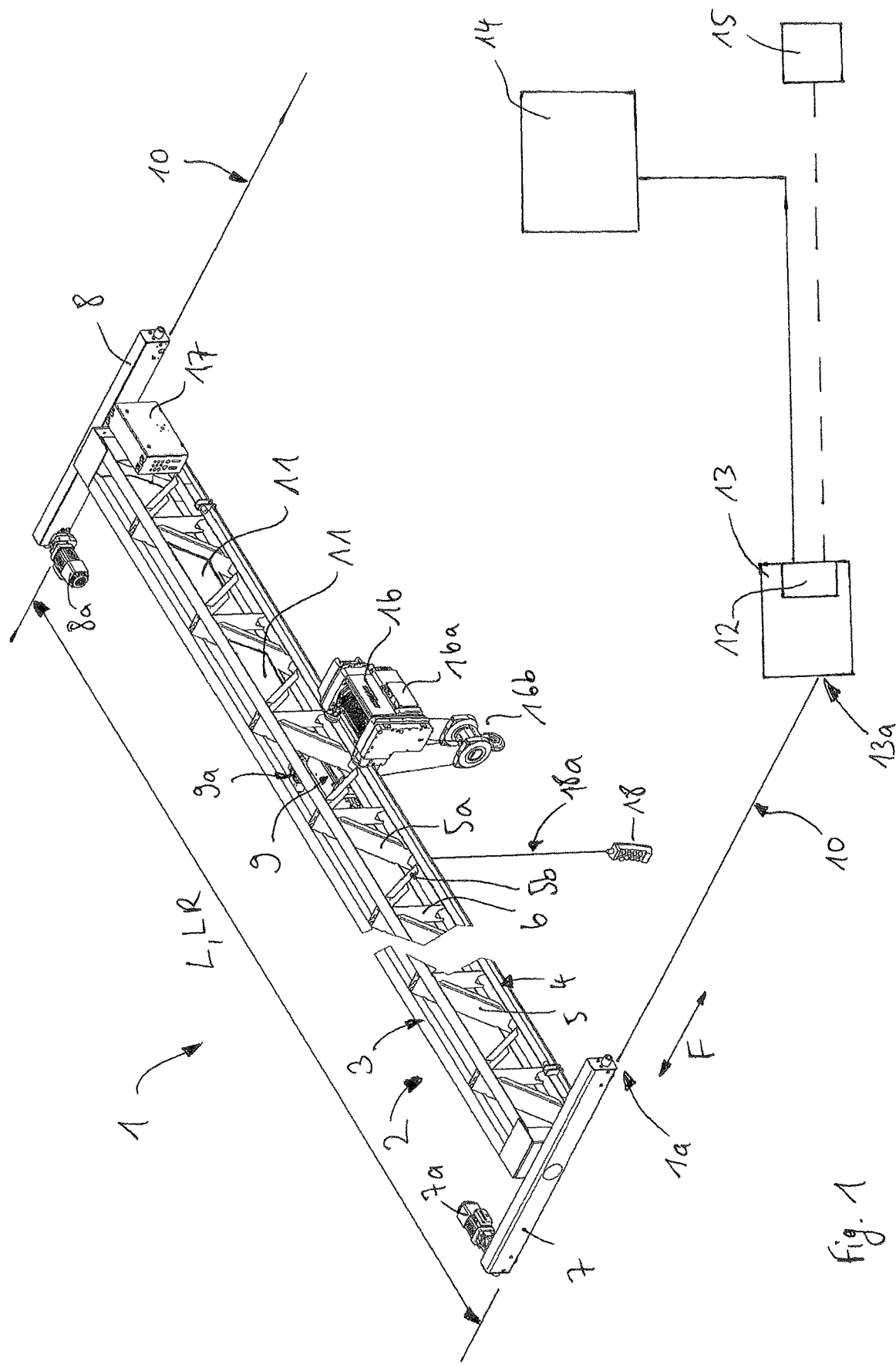
FIG. 1 shows a travelling crane in a first embodiment.

FIG. 1 shows a travelling crane 1 which is formed as a single-girder bridge crane. The travelling crane 1 accordingly comprises a crane girder 2 which is oriented horizontally and extends with a length L in the longitudinal direction LR thereof. The crane girder 2 is formed as a lattice girder. Alternatively, the crane girder 2 can also be formed as a box girder or profile girder, more particularly a rolled-section profile girder.

First and second running gear units 7, 8 are secured to the mutually opposite ends of the crane girder 2 and so a crane bridge which is substantially double-T-shaped in plan view is formed. By means of the running gear units 7, 8, the travelling crane 1 can travel rail-bound in a horizontal direction of travel F transversely to the longitudinal direction LR of the crane girder 2 on a craneway as defined above. The craneway accordingly includes stationary travel rails 10 which are illustrated schematically and are formed by profile girders and on which the running rollers of the running gear units 7, 8 roll. The travel rails 10 are spaced apart from each other in parallel according to the distance between the running gear units 7 and 8, as is typical. Moreover, the travel rails 10 are arranged high above a floor and can be elevated e.g. via a suitable support structure. The support structure can be free-standing or can also be attached to mutually opposite building walls. For improved clarity, the floor and support structure are not shown. In order to move the travelling crane 1 or the crane girder 2 thereof, the first running gear unit 7 is driven by a first electric motor 7a and the second running gear unit 8 is driven by a second electric motor 8a. The electric motors 7a, 8a are thus a component of a travel drive of the travelling crane 1.

A crane trolley 9 having a lifting device 16 designed as a cable winch is suspended on the crane girder 2. The crane trolley 9 can travel via its running gear units transversely to the direction of travel F of the travelling crane 1 and in the longitudinal direction LR of the crane girder 2 or the bottom chord 4 thereof. The running gear units of the crane trolley 9 are hereby supported on running surfaces formed by the bottom chord 4. In the case of dual-girder travelling cranes, the running surfaces can also be arranged in the region of the top chords 3 of the two crane girders 2 or can be formed thereby, and so the crane trolley 9 travels on and between the top chords 3. For travelling purposes, the crane trolley 9 comprises a trolley drive having a trolley motor 9a in the form of a further electric motor. The lifting device 16 carried by the crane trolley 9 includes a lifting drive with a lifting motor 16a likewise formed as an electric motor. A drum can be driven by means of the lifting motor 16a via a transmission. As a result, the carrying means formed as a cable can be wound or unwound on the drum in order to be able to raise or lower a load picking-up means of the lifting device 16, which load-picking-up means are secured to the downwardly hanging end of the carrying means and formed e.g. as a load hook 16b, as well as a load secured thereto. It is also feasible that the lifting device 16 is formed with a chain which can be wound and unwound and thus raised and lowered accordingly as a carrying means.

Further components of the travelling crane 1 include a crane control device 17 and a control switch 18 connected thereto to exchange control signals via a control line 18a. As an alternative to such a pendant control switch connected by a cable, the control switch 18 can also be connected to the crane control device 17 via a wireless control line to exchange control signals (not shown). By actuating the control switch 18 and, associated therewith, transferring control signals to the crane control device 17, the drives of the travelling crane 1, in particular the electric motors 7a, 8a of the travel drive, the trolley motor 9a of the trolley drive and the lifting motor 16a of the lifting drive, can be actuated separately from one another and thus the travelling crane 1 can be operated. If the control switch 18 is formed as a pendant control switch, the control line 18a can also be secured to the crane trolley 9 in order to move the trolley manually along the crane girder 2 by pulling on the pendant control switch 18 accordingly. In this case, the trolley drive with the trolley motor 9a can be omitted. It is also feasible that more than one crane trolley 9 per crane girder 2 is provided, each carrying a lifting device 16.

The lattice structure of the crane girder 2 includes, in addition to the top chord 3 and the bottom chord 4, a plurality of diagonally extending struts 5 and vertical posts 6 which connect the top chord 3 to the bottom chord 4. The struts 5 and posts 6 are each formed flat. The struts 5 are formed as a sheet metal profile having a main surface 5a having a substantially rectangular cross-section, wherein the long sides thereof are bent over at least in a centre region in the form of side surfaces 5b in order to increase buckling resistance. However, it is also feasible that the struts 5 are formed without bent edges and accordingly no side surfaces 5b bent off from the main surface 5 are provided.

The travelling crane 1 comprises at least one first energy storage device 11 which is formed as a rechargeable battery, e.g. as a so-called gel battery or lithium-ion battery. The first energy storage device 11 is connected to the electrical drives, in particular the travel drive, the trolley drive and the lifting device, of the travelling crane 1 in order to supply the drives with energy. For this purpose, an internal energy supply network of the travelling crane 1 is provided, to which the energy storage device 11 and the drives are connected, e.g. via a common intermediate circuit or a plurality of interconnected intermediate circuits of the internal energy supply network. In a similar manner, in addition to the drives, other consumers of the travelling crane 1 can also be connected and can be supplied by the energy storage device 11 with the necessary energy for operation, e.g. lights and the crane control device 17 or a safety control device of the travelling crane 1. Depending upon the type of the electric motors used for the individual drives and of the other consumers and of the respective intermediate circuit, the connection of said components requires the intermediate connection of voltage converters, inverters and/or rectifiers. Each of the electric motors can additionally be formed so as to be capable of power feedback and can be connected to the corresponding intermediate circuit in order to feed electrical energy recovered during regenerative braking or regenerative operation back into the intermediate circuit. This applies in particular for the lifting motor 9a when lowering a load. The fed back energy can be used to charge the first energy storage device 11 or other drives or consumers. A brake resistor can also be connected for the case where the first energy storage device 11 can store no more energy and none of the drives or other consumers has any energy requirements. The voltage fed back by the regenerative braking of the electric motors is then converted into heat by the brake resistor and is thus lost.

By way of the above-described design, the travelling crane 1 can be operated solely by the internal energy supply network of the travelling crane 1. The operation of the travelling crane 1 is thus possible independently of an external energy source which is stationary in relation to all the movements of the travelling crane 1. In order words, a permanent supply of energy or power from the stationary external energy source to the internal energy supply network of the travelling crane 1 is not necessary during the on-going operation thereof. A permanent connection of the internal energy supply network to the stationary external energy source can thus be omitted. This saves having to install corresponding contact lines or cable connections which otherwise are generally guided along the craneway in order to maintain the connection between the internal energy supply network and the external energy source.

FIG. 1 shows by way of example two energy storage devices 11. The energy storage devices 11 are secured to the crane girder 2 and thus to the travelling crane 1 itself. In the present exemplified embodiment, receiving spaces in the running gear structure of the crane girder 2 are used to house and attach the energy storage devices 11, said spaces being provided between two adjacent struts 5 and the top chord 3 and the bottom chord 4. Of course, other receiving spaces and attachment locations on the travelling crane 1 or the crane girder 2 thereof, e.g. on the top chord 3 thereof, can be used to secure the energy storage devices 11. This also applies if the crane girder 2 is not formed as a lattice girder but as a box girder or as a profile girder, in particular a rolled-section profile girder.

Moreover, a charging station 13 which is stationary in relation to all the movements of the travelling crane 1 is provided, via which the first energy storage device 11 can draw energy as required and can be recharged. For this purpose, the travelling crane 1 travels to the charging station 13 arranged stationary e.g. at one end of the craneway, and so an electrical connection between the charging station 13 and the first energy storage device 11 is established e.g. via the internal energy supply network or in parallel therewith for energy transfer. For this purpose, energy transfer means 13a and 1a, respectively, are provided on the charging station 13 and the travelling crane 1 respectively and cooperate with each other and permit contacted and/or contactless energy transfer from the charging station 13 to the first energy storage device 11. For contacted energy transfer, corresponding charging contacts are provided on the charging station 13 and on the travelling crane 1 as the energy transfer means 1a, 13a. For contact-less energy transfer, for example by electromagnetic induction, corresponding coils and electrical conductors are to be attached to the travelling crane 1 and the charging station 13 as the energy transfer means 1a, 13a. Preferably, the respective energy transfer means 1a, 13a are arranged in the region of the craneway or in the region of one or both of the running gear units 7, 8 of the travelling crane 1 such that the charging station 13 forms a type of docking station for the travelling crane 1. The energy transfer means 1a of the travelling crane 1 are accordingly connected to the first energy storage device 11 or the internal energy supply network of the travelling crane 1 in order to be able to feed the energy transferred from the charging station 13 to the first energy storage device 11.

Moreover, a second energy storage device 12 is provided, to which the charging station 13 is connected. The second energy storage device 12 is supplied with power by a solar module 14 and can output the stored energy to the first energy storage device 11 via the charging station 13. The solar module 14 includes one or more solar cells for converting radiation energy, preferably sunlight, into electrical energy and is arranged stationary and in the open air outside of a building, e.g. on or next to a roof of the workspace in which the travelling crane 1 accordingly formed as an indoor crane is installed. The second energy storage device 12 can be arranged, together with the charging station 13, in particular as part of the charging station 13, within the building or together with the solar module 14 outside of the building in order to receive, via a corresponding electrical line, the energy generated by the solar module 14, to store said energy and to transfer said energy to the first energy storage device 11 via the charging station 13. The second energy storage device 12 is thus used as a stationary electrical intermediate storage device which is not moved with the travelling crane 1, unlike the first energy storage device 11. The second energy storage device 12, just like the first energy storage device 11, can include one or more rechargeable batteries, e.g. so-called gel batteries or lithium ion batteries. The fluctuating generation of energy by the solar module 14 can be compensated for by the second energy storage device 12 and therefore the charging of the first energy storage device 11 can be decoupled from the fluctuations in the generation of energy by the solar module 14 in terms of the charging capacity of the second energy storage device 12.

Alternatively or in addition, the second energy storage device 12 can also be connected to the local public power supply network 15 by a line illustrated as a dashed line in FIG. 1, in order to be charged thereby. By integrating the public power supply network 15 for supplying power to the charging station 13 or to the second energy storage device 12, it is also possible to compensate for a relatively long phase of insufficient energy generation by the solar module 14. As a result, times of non-use of the travelling crane 1 when no energy is generated by the solar module 14 over a relatively long period of time can be avoided. The second energy storage device 12 can also be connected initially only to the power supply network 15 if a solar module 14 is not yet installed.

The solar module 14 and the public power supply network 15 each form individually or together a stationary external energy source which supplies power to the charging station 13 or to the second energy storage device 12 connected thereto.

In particular during interruptions in operation, the travelling crane 1 travels to the charging station 13 in order to charge the first energy storage device 11. This can occur automatically after an operator has triggered an interruption in operation of the travelling crane 1 by actuating the control switch 18 accordingly. In this context, the load picking-up means 16b can also be automatically raised, in particular to the highest lifting position below the crane trolley 9, before the travelling crane 1 travels into the charging station 13.

Figure 2:
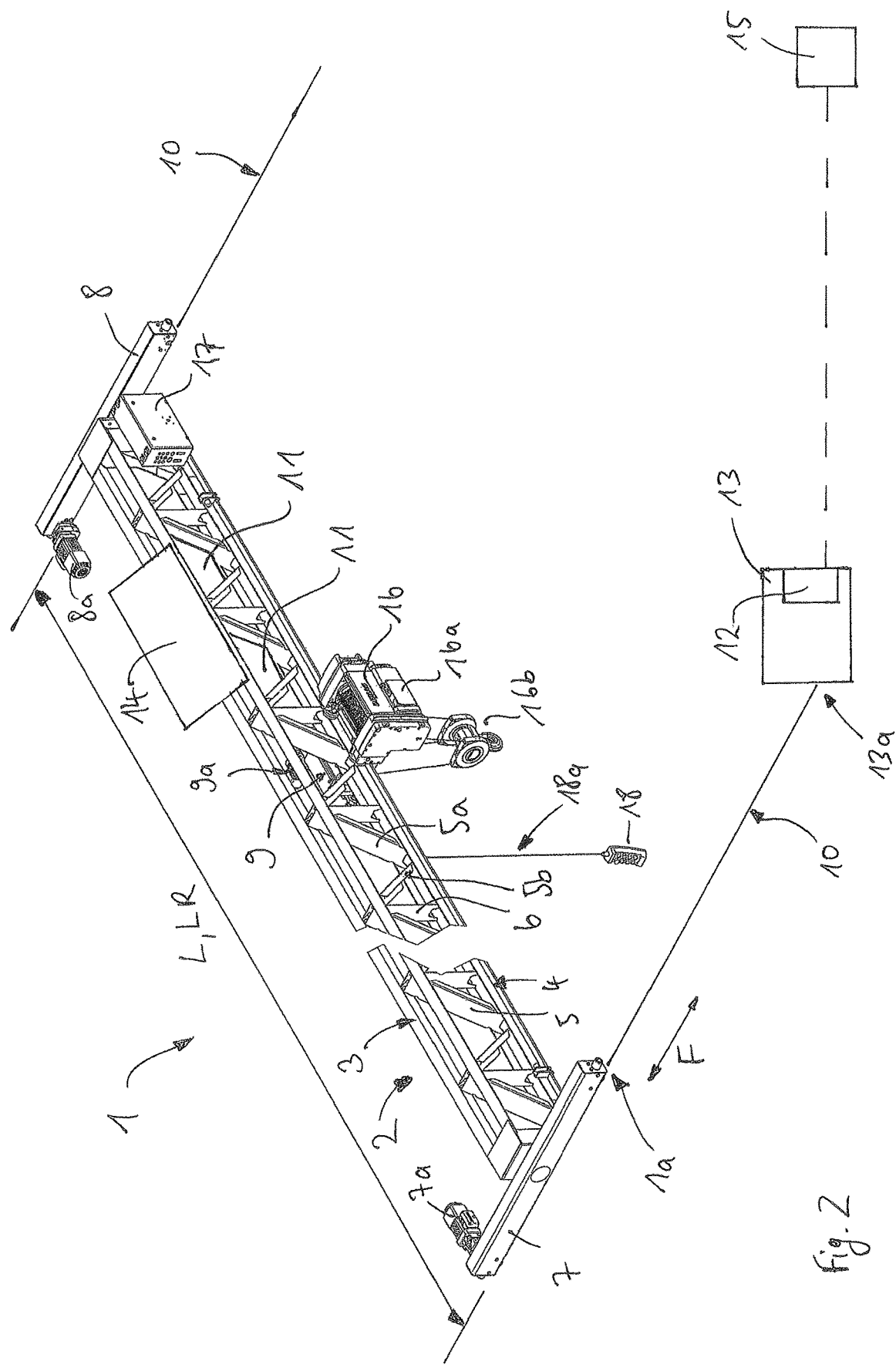
FIG. 2 shows the travelling crane of FIG. 1 in a second embodiment.

FIG. 2 shows the travelling crane 1 of FIG. 1 in a second embodiment. The second embodiment of the travelling crane 1 differs from the first embodiment substantially in that the solar module 14 is not arranged stationary, e.g. on or next to a roof of a workspace, but is arranged on the crane girder 2 and, together with the first energy storage device 11, accordingly moves with the travelling crane 1 as said crane is moved. The solar module 14 is connected to the first energy storage device 11 in order to be able to supply or charge the first energy storage device 11 with the energy generated by the solar module 14. The connection required for this energy transfer between the solar module 14 and the first energy storage device 11 can be provided e.g. via the internal energy supply network or in parallel therewith.

If the internal energy supply network or the first energy storage device 11 is supplied with power exclusively by the solar module 14 as an external energy source moved with the travelling crane 1, this requires operation of the travelling crane 1 in environmental conditions, e.g. light conditions, which permit sufficient generation of energy by the solar module 14. The second embodiment is thus suitable in particular for a travelling crane 1 which is installed at least partially in the open air.

However, according to an alternative of the second embodiment, fluctuations in the generation of energy by the solar modular 14 can also be compensated for in that a charging station 13 connected to the public power supply network 15 according to the first embodiment is also additionally installed as an external energy source. In a similar manner to the first embodiment, a second energy storage device 12 can likewise be incorporated.

The remaining statements in relation to the first embodiment of FIG. 1 apply, mutatis mutandis, to FIG. 2.

The invention claimed is:

1. A travelling crane comprising:
a horizontally extending crane girder configured to travel rail-bound along a craneway, wherein the crane girder includes mutually opposite ends with a running gear unit secured to each of the ends, wherein the craneway includes stationary profile girders serving as travel rails, and wherein the travel rails extend spaced apart from each other and in parallel with each other in the horizontal direction of travel of the travelling crane and are arranged above a floor with each running gear unit configured to travel along a respective one of the travel rails;
a crane trolley configured to travel along the crane girder;
a lifting device configured to raise and lower a load, wherein the lifting device is carried by the crane trolley and comprises a carrier formed as a cable or chain;
electrical drives for movement of the travelling crane, wherein a first energy storage device is connected to the electrical drives in order to supply the electrical drives with energy, and wherein the electrical drives comprise an electrical drive at each running gear unit for movement of the crane girder; and a charging station configured to be approached by the travelling crane such that the first energy storage device can draw energy from the charging station as required when the travelling crane is in the charging station, wherein the charging station is configured to draw energy from an external energy source comprising a solar module and/or a public power supply network, and wherein a second energy storage device is provided that is continuously connected to the charging station and the external energy source in order to draw energy from the external energy source, to store said energy and to output said energy to the first energy storage device of the travelling crane via the charging station.

2. The travelling crane as claimed in claim 1, wherein the travelling crane includes additional components that consume electricity in addition to the electrical drives at the running gear units with the additional components comprising other electrical consumers, and wherein the first energy storage device is connected to the other electrical consumers in order to supply the other electrical consumers with energy.

3. The travelling crane as claimed in claim 2, wherein the first energy storage device is arranged on the crane girder.

4. The travelling crane as claimed in claim 3, wherein the charging station is configured to transfer energy to the first energy storage device in a contacted and/or contact-less manner.

5. The travelling crane as claimed in claim 1, wherein the first energy storage device of the travelling crane is connected to a solar module in order to be charged thereby and the solar module is arranged on the crane girder.

6. The travelling crane as claimed in claim 1, wherein the crane girder comprises a first crane girder, and wherein the travelling crane comprises a second crane girder that extends in parallel with and spaced apart from the first crane girder so that the crane trolley can travel along the first and second crane girders.

7. The travelling crane as claimed in claim 1, wherein the first energy storage device is arranged on the crane girder.

8. The travelling crane as claimed in claim 7, wherein the first energy storage device of the travelling crane is connected to a solar module in order to be charged thereby.

9. The travelling crane as claimed in claim 1, wherein the charging station is configured to transfer energy to the first energy storage device in a contacted and/or contact-less manner.

10. The travelling crane as claimed in claim 1, wherein the charging station is disposed along one of the travelling rails.

11. The travelling crane as claimed in claim 10, wherein the charging station forms a docking station for a selected one of the running gear units whereby the first energy storage device can draw energy from the docking station as required when the selected one of the running gear units is at the docking station.

12. The travelling crane as claimed in claim 1, wherein the first energy storage device can draw energy from the charging station via a selected one of the running gear units when the selected one of the running gear units is at the charging station.

13. A method for charging an energy storage device of a travelling crane comprising:

providing a travelling crane comprising:

a horizontally extending crane girder configured to travel rail-bound along a craneway, wherein the crane girder includes mutually opposite ends with a running gear unit secured to each of the ends, wherein the craneway includes stationary profile girders serving as travel rails, and wherein the travel rails extend spaced apart from each other and in parallel with each other in the horizontal direction of travel of the travelling crane and are arranged above a floor with each running gear unit configured to travel along a respective one of the travel rails;

a crane trolley configured to travel along the crane girder-; a lifting device configured to raise and lower a load, wherein the lifting device is carried by the crane trolley and comprises a carrier formed as a cable or chain;

electrical drives for movement of the travelling crane, wherein the electrical drives comprise an electrical drive at each running gear unit for movement of the crane girder;

an energy storage device connected to the electrical drives in order to supply the electrical drives with energy; and a charging station configured to be approached by the travelling crane such that the first energy storage device can draw energy from the charging station as required when the travelling crane is in the charging station, wherein the charging station is configured to draw energy from an external energy source comprising a solar module and/or a public power supply network, and wherein a second energy storage device is provided that is continuously connected to the charging station and the external energy source in order to draw energy from the external energy source, to store said energy and to output said energy to the first energy storage device of the travelling crane via the charging station;

automatically moving the travelling crane to a charging station during an interruption in operation of the travelling crane; and charging the first energy storage device at the charging station after said automatically moving the travelling crane to the charging station.

14. The method as claimed in claim 13, further comprising raising a load pick-up device of the traveling crane, and wherein said automatically moving the travelling crane to the charging station occurs after said raising the load pick-up device of the traveling crane.

15. The method as claimed in claim 14, wherein said raising the load pick-up device of the traveling crane comprises raising the load pick-up device of the traveling crane to the highest lifting position below the crane trolley.

16. The method of claim 13, wherein the charging station is disposed along one of the travelling rails.

17. The method of claim 16, wherein said automatically moving the traveling crane to a charging station comprises automatically moving the crane girder to the charging station.

18. The method of claim 17, wherein said automatically moving the crane girder to the charging station comprises automatically moving one of the running gear units to the charging station, and wherein said charging the first energy storage device at the charging station after said automatically moving the travelling crane to the charging station comprises charging the first energy storage device by contact or contact-less charging at the running gear unit that was moved to the charging station.

* * * * *